(12) United States Patent
Guy

(10) Patent No.: US 10,858,038 B2
(45) Date of Patent: Dec. 8, 2020

(54) STEERING CONTROL SYSTEM

(71) Applicant: Keith Alan Guy, San Luis Obispo, CA (US)

(72) Inventor: Keith Alan Guy, San Luis Obispo, CA (US)

( * ) Notice: Subject to any disclaimer, the term of this patent is extended or adjusted under 35 U.S.C. 154(b) by 109 days.

(21) Appl. No.: 15/975,650

(22) Filed: May 9, 2018

(65) Prior Publication Data

US 2018/0257699 A1 Sep. 13, 2018

Related U.S. Application Data

(63) Continuation of application No. 15/188,797, filed on Jun. 21, 2016, now Pat. No. 9,969,424.

(51) Int. Cl.
| | | |
|---|---|---|
| *B62D 5/04* | (2006.01) | |
| *B62D 15/02* | (2006.01) | |
| *B62D 6/00* | (2006.01) | |
| *B60W 40/02* | (2006.01) | |

(52) U.S. Cl.
CPC ........... *B62D 5/0463* (2013.01); *B60W 40/02* (2013.01); *B62D 6/00* (2013.01); *B62D 15/021* (2013.01); *B62D 15/025* (2013.01); *B60W 2510/22* (2013.01); *B60W 2520/10* (2013.01); *B60W 2530/10* (2013.01); *B60W 2552/00* (2020.02); *B60W 2555/20* (2020.02)

(58) Field of Classification Search
CPC ...... B62D 5/0463; B62D 6/00; B62D 15/025; B62D 15/021; B60W 2510/22; B60W 2530/10; B60W 2520/10; B60W 2550/14; B60W 2550/12; B60W 2550/142; B60W 2550/10; B60W 40/13; B60W 10/22; B60W 10/20; B60W 2710/207; B60W 2720/30; B60W 2540/18; B60W 2550/148; B60W 2040/1315; B60W 40/02; B60G 17/0165; B60G 2401/14; B60G 2401/142; B60G 2400/204; B60G 2400/41; B60G 2200/46
See application file for complete search history.

(56) References Cited

U.S. PATENT DOCUMENTS

| | | |
|---|---|---|
| 5,111,901 A | 5/1992 | Bachhuber et al. |
| 5,388,658 A | 2/1995 | Ando et al. |
| 6,539,298 B2 | 3/2003 | Inagaki et al. |
| 6,554,094 B1 | 4/2003 | Bell et al. |
| 7,416,264 B2 | 8/2008 | Tsukasaki |
| 7,857,085 B2 | 12/2010 | Spark |
| 8,051,942 B2 | 11/2011 | Sasaki et al. |

(Continued)

FOREIGN PATENT DOCUMENTS

| | | |
|---|---|---|
| JP | 5508842 | 6/2014 |
| WO | 03059720 | 7/2003 |

*Primary Examiner* — Basil T. Jos
(74) *Attorney, Agent, or Firm* — Fish IP Law, LLP

(57) ABSTRACT

A steering control system for a vehicle that considers the limitations of at least one of the vehicle and the environment is contemplated. The steering control system can receive a vehicle characteristic, an environmental condition, a desired amount of turning, and a desired velocity of the vehicle. Based on some, or all of these parameters, the steering control system can determine at least one of a wheel torque, a wheel angle, a wheel camber, and a wheel suspension for a desired vehicle path to enhance vehicle performance.

20 Claims, 4 Drawing Sheets

(56) References Cited

U.S. PATENT DOCUMENTS

| | | | |
|---|---|---|---|
| 2008/0208416 A1* | 8/2008 | Yuet | B60T 7/12 |
| | | | 701/50 |
| 2009/0143940 A1 | 6/2009 | Rhodes et al. | |
| 2011/0160963 A1 | 6/2011 | Yasui et al. | |
| 2012/0041644 A1 | 2/2012 | Turner | |
| 2014/0309885 A1 | 10/2014 | Ricci | |
| 2014/0379235 A1 | 12/2014 | Bazaz | |

\* cited by examiner

STEERING CONTROL SYSTEM

This application is a continuation of U.S. patent application with the Ser. No. 15/188,797, filed Jun. 21, 2016, which is incorporated herein by reference in its entirety.

FIELD OF THE INVENTION

The field of the invention is a steering control system for vehicles, and more specifically, a steering control system that considers limitations of at least one of the vehicle and the environment.

BACKGROUND

The background description includes information that may be useful in understanding the present invention. It is not an admission that any of the information provided herein is prior art or relevant to the presently claimed invention, or that any publication specifically or implicitly referenced is prior art.

Steering control systems are an important component in a vehicle system. Steering control systems allow a vehicle to turn and follow a desired course. For example, a conventional steering system can turn a pair of front wheels in a four-wheeled vehicle to allow the vehicle to change direction from a straight line path.

Some have contemplated steering control systems that provide independent control of at least two different wheels in a wheeled vehicle. For example, Ando (U.S. Pat. No. 5,388,658) discloses a vehicle control system for controlling individual wheel torque and steering angle in response to a desired forward velocity, a desired steering angle, actual angular velocities of each controlled wheel, and other parameters. The system further monitors a tire adhesion limit that modifies a command signal to the controlled wheels to prevent the vehicle from spinning or sliding.

In another example, Bell (U.S. Pat. No. 6,554,094) contemplates a steering control system that provides independent control of at least two different wheels. Bell discloses a system that determines a desired turning angle for each of two wheels based on a desired amount of turning and a direction for the desired amount of turning. An electronic control unit controls turning mechanisms for each of the wheels so that the wheels are turned independently. Similarly, Spark (WIPO Pub. No. WO 03/059720) also contemplates a steering control system that provides independent control of wheels of a vehicle.

Others have contemplated vehicle control systems that modify steering based on the presence of a predetermined condition. For example, Tsukasaki (U.S. Pat. No. 7,416,264) discloses a system that defines an angle of the wheels in accordance with a braking force that is applied to the wheels when the vehicle is braking to thereby reduce the braking distance or the braking time. In another example, Ricci (U.S. Pat. Pub. No. 2014/0309885) discloses vehicle control system that can control and/or activate features of the vehicle (e.g., changing braking mode, changing responsiveness of steering, etc.) based on determining whether there is an environmental condition (e.g., rain, fog, etc.).

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Although the materials discussed above highlight advancements related to steering control systems, it should be appreciated that numerous improvements can be made to further enhance vehicle performance (e.g., reducing wear and tear on wheels, increasing fuel efficiency). Thus, there is still a need in the art for improved steering control systems.

SUMMARY OF THE INVENTION

The inventive subject matter provides apparatus, systems, and methods in which a steering control system for a vehicle having a first wheel and a second wheel can enhance vehicle performance (e.g., reducing wear and tear on wheels, increasing fuel efficiency). The steering control system comprises a plurality of sensors that are configured to sense an environmental condition, a desired amount of turning, and a desired velocity of the vehicle. Based on at least these sensed parameters, a calculating controller determines a correcting wheel torque and a correcting wheel angle of at least one of the first and second wheels. An effecting controller is configured to apply the correcting wheel torque and the correcting wheel angle to at least one of the first and second wheels. It should be appreciated that considering the limitations of the vehicle and the environment before modifying the wheel angle or wheel torque substantially reduces, or even eliminates, the need to make corrections while the vehicle is on a desired path.

In one contemplated system, the steering control system comprises an environmental condition sensor, a steering angle sensor, and a speed sensor. The environmental condition sensor is configured to detect an environmental condition (e.g., a low visibility, a low traction, a temperature, an obstruction, a high wind, and a slope of road, etc.), the steering angle sensor configured to sense a desired amount of turning, and the speed sensor configured to sense a desired velocity of the vehicle. As used herein, a desired amount of turning refers to an intended modification of direction of the vehicle by a user (e.g., user turning steering wheel, steering control system receiving vector input, etc.), and a desired velocity refers to an intended modification of velocity of the vehicle (e.g., user pushing a gas pedal, steering control system receiving a velocity input). Thus, the desired amount of turning and the desired velocity can collectively set a future location for the vehicle, and the starting position of the vehicle to the future location can define a desired path. It is contemplated that each of the desired amount of turning and the desired velocity can be a single value or can comprise multiple values to set a more complex vehicle path.

A calculating controller can be coupled to the environmental condition sensor, the steering sensor, and the speed sensor to receive the environmental condition, the desired amount of turning, and the desired velocity. Based on at least these parameters, the calculating controller thereby determines a correcting wheel torque and a correcting wheel angle of at least one of the first wheel and the second wheel. As used herein, the wheel angle refers to the angle at which a wheel is pointing (i.e., a steering angle of wheel), and the wheel torque refers to the torque applied to turn the wheel. In other embodiments, the correcting wheel torque and the correcting wheel angle can be based on at least one of the environmental condition, the desired amount of turning, and the desired velocity. The environmental condition, the desired amount of turning, and the desired velocity of the vehicle can be either sensed or received by the system (e.g., provided by a user, database, etc.).

The correcting wheel angle can be a set of wheel angles to be applied to at least one of the first and second wheels, or a single wheel angle to be applied to at least one of the first and second wheels. Similarly, the correcting wheel torque can be a set of wheel torque values to be applied to at least one of the first and second wheels, or a single wheel torque value. For example, the correcting wheel angle and the correcting wheel torque can be a set of values to be applied to at least one of the first and second wheels while the vehicle is traveling along a desired path (which can coincide with the path to a future location defined by the desired amount of turning and the desired velocity or can be a more optimal path to the future location created by the correcting wheel angle and the correcting wheel torque). Advantageously, there is a reduced risk that a correction will be needed by the vehicle as it travels along the desired path.

The environmental condition can be any number of conditions that may impose a burden on the vehicle. For example, the environmental condition can be at least one of a low visibility (e.g., rain, fog, dust, smoke, snow, etc.), a low traction (e.g., water, ice, snow, loose material, etc.), a temperature (e.g., high temperature, low temperature), a physical obstruction (e.g., a vehicle or rock on the path), a high wind, and a slope of road. By considering environmental conditions, steering control system can determine a correcting wheel angle and a correcting wheel torque to avoid or better handle the environmental condition as the vehicle travels along a desired path.

It is contemplated that the steering control system further receives a plurality of vehicle characteristics (i.e., properties of the vehicle), such as a weight of vehicle, a center of mass of vehicle, a distance between the first wheel and the second wheel, a length of the vehicle, a footprint of the vehicle, a width of the vehicle, a number of wheels of the vehicle, a size of the wheels of the vehicle, a steer angle range of the wheels of the vehicle, a steer angle speed of the vehicle, a camber range of the wheels of the vehicle, gradeability of the vehicle, a camber speed of the wheels of the vehicle, and speed and torque capabilities of drive motors to determine the correcting wheel torque and the correcting wheel angle. These characteristics can be sensed or provided by a user or a database. It is contemplated that at least one vehicle characteristic can change after at least one of the correcting wheel angle and the correcting wheel torque have been applied whereby the steering control system can further determine a second correcting wheel angle and a second correcting wheel torque to accommodate the changed vehicle characteristic.

The vehicle characteristics can be helpful in determining the boundaries for at least one of a correcting wheel angle and a correcting wheel torque. For example, calculating controller can receive the desired amount of turning, the desired velocity, and the environmental condition to thereby determine a correcting wheel torque and a correcting velocity for a wheel that are within the torque capabilities and steer angle range of the wheel to ensure that the vehicle can perform the correcting wheel torque and the correcting velocity. If a vehicle characteristic were to change, then the steering control system can detect the change and the calculating controller can determine a second correcting wheel torque and a second correcting wheel angle to accommodate the changed vehicle characteristic. For example, if the vehicle has four wheels that are each steerable, but then one wheel malfunctions, then the calculating controller can determine a second correcting wheel torque and a second correcting wheel angle for the remaining wheels to accommodate the change in the number of steerable wheels. It should be appreciated that accounting for vehicle characteristics ensures that the vehicle is capable of performing the steering controls (e.g., correcting wheel angle and torque) that are produced by the steering control system.

In some embodiments, the calculating controller can be configured to independently determine (i) the correcting wheel torque and the correcting wheel angle for the first wheel, and (ii) a second correcting wheel torque and a second correcting wheel angle for the second wheel. In such embodiment, the effecting controller can be configured to independently adjust (i) the first wheel to apply the correcting wheel torque and the correcting wheel angle, and (ii) the second wheel to apply the second correcting wheel torque and the second correcting wheel angle.

Besides a correcting wheel angle and torque, it is contemplated that the calculating controller is configured to receive the environmental condition, the desired amount of turning, and the desired velocity to thereby determine at least one of a correcting wheel camber and a correcting suspension of at least one of the first wheel and the second wheel. As used herein, a wheel camber refers to the angle between the vertical axis of a wheel and a vertical axis perpendicular to the flat ground, and wheel suspension refers to a vertical movement of a wheel relative to the chassis or vehicle body. It should be appreciated that the plurality of vehicle characteristics can also be received by the calculating controller to determine the correcting wheel camber and the correcting suspension. The effecting controller can apply the correcting wheel camber and the correcting suspension to at least one of the first wheel and the second wheel. It should be appreciated that adjusting wheel camber and suspension provides broader control over the vehicle that allows fine tuning of the vehicle in order to reduce wear and tear of the wheels and optimize fuel efficiency.

Similar to correcting wheel torque and correcting wheel angle, it is contemplated that the correcting wheel camber and the correcting wheel suspension can each comprise a single value or multiple values that are applied while the vehicle travels on a desired path. For example, the correcting wheel suspension can comprise a change in the vertical movement of a wheel to lift the wheel from the ground to avoid a physical obstruction on the ground, and a second change in the vertical movement of the wheel that places the wheel back on the ground after passing the physical obstruction.

It is contemplated that the vehicle can have different steering modes, and the calculating controller can determine an appropriate steering mode based on the environmental condition, the desired amount of turning, and the desired velocity. For example, a vehicle can comprise a third and fourth wheel, and the calculating controller can determine a steering mode for the first wheel, the second wheel, the third wheel, and the fourth wheel based on the environmental condition, the desired amount of turning, and the desired velocity. The steering mode can be front wheel steering mode, rear wheel steering mode, all-wheel steering mode (e.g., crab steering), and zero turn mode as deemed appropriate by the calculating controller.

In another aspect, a method of controlling a vehicle having a first wheel and a second wheel is contemplated. The method comprises steps of (i) providing a plurality of vehicle characteristics that are specific to the vehicle, and (ii) detecting an environmental condition, a desired amount of turning, and a desired velocity of the vehicle. A correcting wheel torque and a correcting wheel angle of at least one of the first wheel and the second wheel is calculated based on the plurality of vehicle characteristics, the environmental condition, the desired amount of turning, and the desired velocity. A wheel torque and a wheel angle of at least one of the first wheel and the second wheel is adjusted to the correcting wheel torque and the correcting wheel angle of the at least one of the first wheel and the second wheel.

As discussed above, the environmental condition can be a low visibility (e.g., rain, fog, dust, smoke, snow, etc.), a low traction (e.g., water, ice, snow, loose material, etc.), a temperature (e.g., high temperature, low temperature), an obstruction (e.g., a vehicle or rock on the path), a high wind, and a slope of road. The environmental condition, the desired amount of turning, the desired velocity of the vehicle, and the plurality of vehicle characteristics can be either sensed or received by the system (e.g., provided by a user, database, etc.).

The plurality of vehicle characteristics comprises at least two of a weight of vehicle, a center of mass of vehicle, a distance between the first wheel and the second wheel, a length of the vehicle, a footprint of the vehicle, a width of the vehicle, a number of wheels of the vehicle, a size of the wheels of the vehicle, a steer angle range of the wheels of the vehicle, a steer angle speed of the vehicle, a camber range of the wheels of the vehicle, a camber speed of the wheels of the vehicle, and speed and torque capabilities of drive motors. It is contemplated that a second plurality of vehicle characteristics can be provided to thereby calculate a second correcting wheel torque and wheel angle of at least one of the first and second wheels. For example, a second plurality of vehicle characteristics can be provided if the weight of the vehicle changes (e.g., the payload of the vehicle is increased) to accommodate the changed characteristic of the vehicle.

It is contemplated that the center of mass of the vehicle can be monitored to thereby calculate a correcting wheel torque and wheel angle of at least one of the first wheel and the second wheel and shift the center of mass of the vehicle from a first location to a second location. A correcting wheel camber and suspension can also be determined based on the center of mass of the vehicle. It should be appreciated that the center of mass can be adjusted to reduce the risk of vehicle rollover.

In some embodiments, a deviation can be determined in at least one of the plurality of vehicle characteristics, the environmental condition, the desired amount of turning, and the desired velocity after the wheel torque and the wheel angle of at least one the first wheel and the second wheel is adjusted. For example, the steering control system can detect an obstruction and calculate a correcting wheel angle and torque for at least one of the wheels, but the obstruction is removed after the correcting wheel angle and torque are applied, such that a deviation is detected. When a deviation is determined, a second correcting wheel torque and a second correcting wheel angle of at least one of the first wheel and the second wheel can be calculated to accommodate for the deviation. The wheel torque and the wheel angle of at least of the first wheel and the second wheel is adjusted based on the second correcting wheel torque and the second correcting wheel angle.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
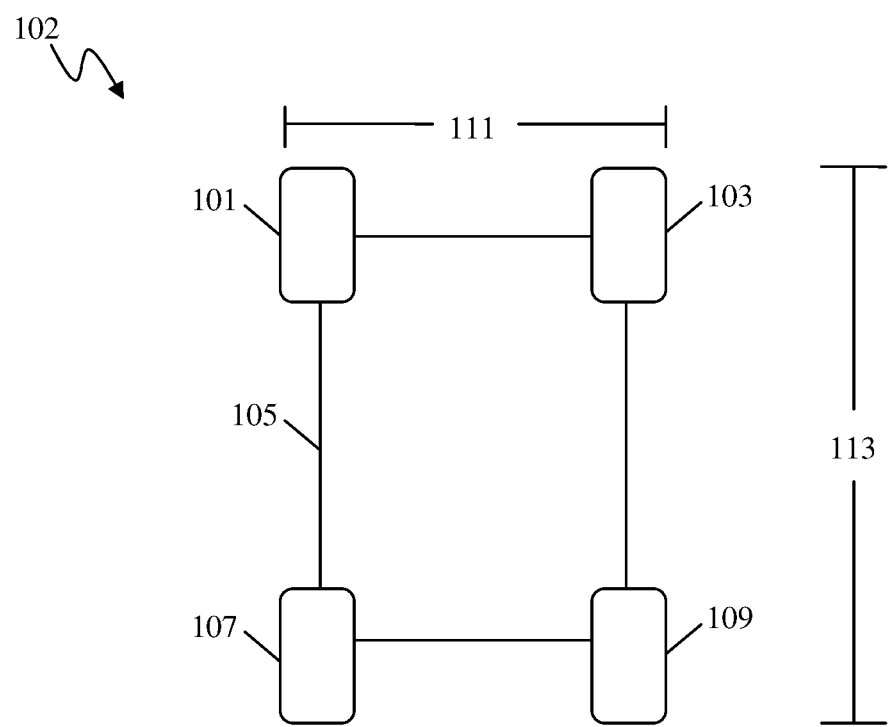
FIG. 1 depicts an embodiment of a vehicle comprising a steering control system.

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The inventor has discovered that a steering control system can determine and apply an optimal wheel torque and wheel angle of at least one wheel in a conceptually simple and effective process to thereby reduce wear and tear on the wheels and improve fuel efficiency. A correcting wheel torque and a correcting wheel angle of at least one of the wheels is determined based on at least one of an environmental condition, a desired amount of turning, a desired velocity of the vehicle, and a vehicle characteristic. Preferably, the vehicle limitations (i.e., the properties and capabilities of the vehicle) and the environmental conditions (i.e., obstacles imposed by external environment) are used to determine a correcting wheel torque and a correcting wheel angle that (i) the vehicle is capable of performing and (ii) will reduce the risk of failure in reaching the final destination. In other words, the steering control system can receive desired input values (e.g., desired velocity and desired amount of turning) and review the limitations of the vehicle and the environmental condition to thereby generate correcting values (e.g., correcting wheel angle and correcting wheel torque) that the vehicle is capable of performing.

Typically, the desired amount of turning and the desired velocity of the vehicle collectively set a future location of the vehicle, and the starting location to the future location define a desired path for the vehicle. Prior to traveling on the desired path, the correcting wheel torque and the correcting wheel angle can be applied to the wheels to avoid the need for corrections of the wheel torque and angle as the vehicle travels in its desired path (which can coincide with the path to a future location defined by the desired amount of turning and the desired velocity or can be a more optimal path to the future location created by the correcting wheel angle and the correcting wheel torque). In other words, contemplated steering control systems consider limitations of the vehicle and the environment to establish a correcting wheel angle and correcting wheel torque for the vehicle to travel in a desired path. It is also contemplated that a correcting wheel camber and wheel suspension can also be determined to provide even greater control of the vehicle.

In FIG. 1, a vehicle 102 comprising a steering control system is shown. Vehicle 102 comprises a first wheel 101 and a second wheel 103 coupled to a vehicle body 105. It is contemplated that first wheel 101 and second wheel 103 are coupled to a chassis that is coupled to vehicle body 105. Vehicle 102 further comprises a third wheel 107 and a fourth wheel 109. Although vehicle 102 is shown as a four-wheeled vehicle, it is contemplated that vehicle 102 can comprises less wheels (e.g., one-wheeled vehicle, two-wheeled vehicle, three-wheeled vehicle) or more wheels, or can comprise wheel that are not steerable. Furthermore, it is contemplated that vehicle 102 can comprise a pair of continuous tracks, such that vehicle 102 is a tracked vehicle rather than a wheeled vehicle.

Vehicle 102 comprises a plurality of vehicle characteristics, which are typically properties of vehicle 102. For example, the plurality of vehicle characteristics can comprise a weight of vehicle 102, a center of mass of vehicle 102, a width 111 of vehicle 102, a length 113 of vehicle 102, a distance between first wheel 101 and second wheel 103 of vehicle 102, and so forth. It should be appreciated that the vehicle characteristics are useful for understanding the limitations of vehicle 102 when determining at least one of a correcting wheel torque, a correcting wheel angle, a correcting wheel camber, and a correcting wheel suspension.

In some embodiments, the vehicle characteristics of vehicle 102 can change. For example, a load can be placed on vehicle 102 that increases its payload and changes the center of mass of vehicle 102. It should be appreciated that vehicle 102 can include a single load, multiple loads of the same type, or multiple loads of various types. In some embodiments, vehicle 102 comprises a robotic arm and another load. It is contemplated that the robotic arm can be used to move the other load so as to shift the center of mass of vehicle 102. Additionally, or alternatively, the robotic arm can act as a counterweight or can be positioned to shift the center of mass of vehicle 102.

In another example, width 111 and/or length 113 of vehicle can expand or contract (e.g., a rod can extend from vehicle body 105 to alter the center of mass of vehicle 102). Regardless of the change to vehicle characteristics of vehicle 102, it is contemplated that the steering control system can recognize the change and accommodate for the change by modifying at least one of the wheel torque, the wheel angle, the wheel camber, and the wheel suspension of at least one wheel of vehicle 102.

Figure 2:
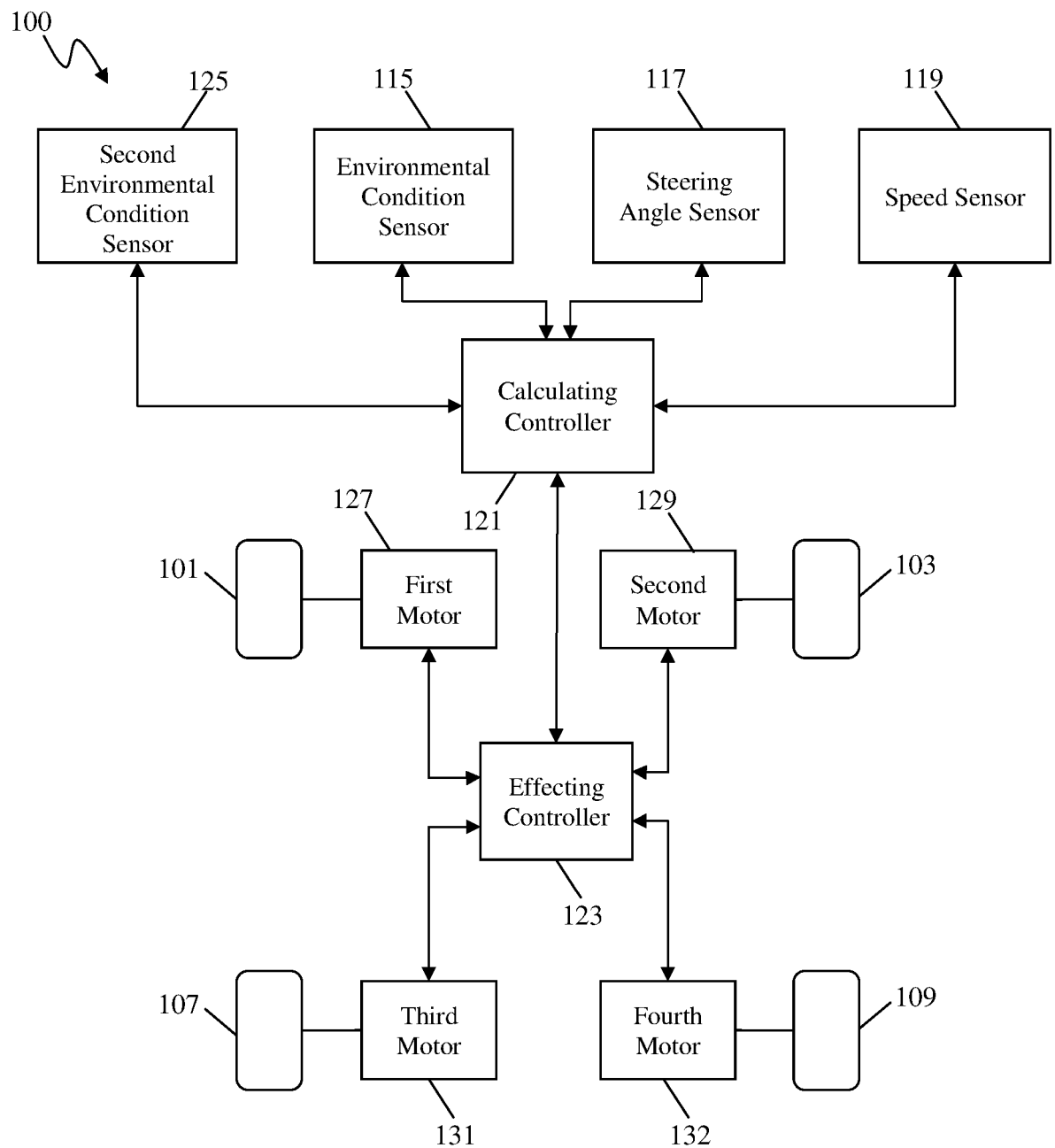
FIG. 2 is an exemplary schematic of the vehicle in FIG. 1.

A steering control system 100 for vehicle 102 is shown in FIG. 2. Steering control system 100 comprises a plurality of sensors, including (i) an environmental condition sensor 115 that is configured to detect an environmental condition, (ii) a steering angle sensor 117 configured to sense a desired amount of turning, and (iii) a speed sensor 119 configured to sense a desired velocity of the vehicle. Suitable sensors include LIDAR, ultrasound, radar, mono camera, stereo vision, 3D vision, GPS, IMU, INS, gyroscope, ultra-wide band, encoders, and active bumpers. The plurality of sensors can also comprise a proximity sensor configured to sense a location of an object (e.g., wheel, robotic arm, obstruction) in relation to vehicle 102. For example, vehicle 102 can comprise a robotic arm that extends from vehicle body 105 and a proximity sensor disposed on vehicle body 105, such that the proximity sensor is used to inform steering control system 100 the location of the robotic arm in relation to vehicle body 105. It should be appreciated that understanding the location of the robotic arm allows steering control system 100 to manipulate the position of the robotic arm to shift the center of mass of vehicle 102.

Viewed from another perspective, a robotic arm on vehicle 102 can reconfigure a load on vehicle 102 such that vehicle does not tip over when crossing uneven or sloped terrain. It should be appreciated that the robotic arm can also change its shape, configuration, position, or orientation on the assembly to favorably alter the center of mass of vehicle 102.

A calculating controller 121 can be coupled to environmental condition sensor 115, steering angle sensor 117, and speed sensor 119 to receive the environmental condition, the desired amount of turning, and the desired velocity. Calculating controller thereby determines a correcting wheel torque and a correcting wheel angle of at least one of first wheel 101 and second wheel 103. The correcting wheel torque and the correcting wheel angle are applied to at least one of first wheel 101 and second wheel 103 by an effecting controller 123.

Although sensors can be used to sense the environmental condition, the desired amount of turning, and the desired velocity as shown in FIG. 2, it is contemplated that at least one of the environmental condition, the desired amount of turning, and the desired velocity can be provided by a user or a database. For example, calculating controller 121 can be coupled to a computer that allows a user to generate inputs for a desired amount of turning and a desired velocity for calculating controller 121. Additionally, or alternatively, calculating controller 121 can be coupled to a mapping database and/or a weather database to receive mapping and/or weather data (e.g., weather conditions, traffic information, terrain information, alternative route information, etc.). Thus, calculating controller 121 can receive inputs from a source that is external to vehicle 102 (e.g., a signal that is sent to an autonomous vehicle) or from a source within vehicle 102 (e.g., a driver can turn a steering wheel or push on a gas pedal).

In yet another embodiment, at least one of the environmental condition, the desired amount of turning, and the desired velocity can be provided by another vehicle that is coupled to vehicle 102. In such embodiment, an information sharing scheme is contemplated whereby a plurality of vehicles can share information directly to one another and/or to a database that is coupled to the plurality of vehicles. It is contemplated that the steering control systems of each of the vehicles can be participating in deep machine learning to further improve determinations of correcting wheel angle, torque, suspension, and camber. Additionally, or alternatively, it is contemplated that vehicle 102 can communicate with another vehicle or a database that logged data from another vehicle that already applied a correcting wheel torque and a correcting wheel angle having the same desired velocity and desired amount of turning to determining a correcting wheel angle and torque for vehicle 102 (i.e., historical data can be used to determine a correcting wheel angle and correcting wheel torque).

As discussed above, environmental condition sensor 115 can sense an environmental condition. The environmental condition can include at least one of a low visibility (e.g., rain, fog, dust, smoke, snow, etc.), a low traction (e.g., water, ice, snow, loose material, etc.), a temperature (e.g., high temperature, low temperature), an obstruction (e.g., a vehicle or rock on the path), a high wind, and a slope of road. It is contemplated that steering control system 100 can comprise a second environmental condition sensor 125 configured to detect a second environmental condition. Second environmental condition sensor 125 can be coupled to calculating controller 121 to receive the second environment condition along with the desired velocity, the desired amount of turning, and the environmental condition. Using these parameters, it is contemplated that calculating controller 121 can determine the correcting wheel torque and the correcting wheel angle of at least one of the first wheel and the second wheel, and effecting controller 123 can apply the correcting wheel angle and torque.

Calculating controller 121 can further receive a vehicle characteristic that is specific to vehicle 102. For example, calculating controller 121 can receive at least one of a weight of vehicle 102, a center of mass of vehicle 102, a distance between first wheel 101 and second wheel 103, length 113 of vehicle 102, and width 111 of vehicle 102 to determine the correcting wheel torque and the correcting wheel angle. It is contemplated that a vehicle characteristic comprises a weight of vehicle 102, a center of mass of vehicle 102, a distance between the first wheel 101 and the second wheel 103, a length of vehicle 102, a footprint of vehicle 102, a width of vehicle 102, a number of wheels of vehicle 102, a size of the wheels of vehicle 102, a steer angle range of the wheels of vehicle 102, a steer angle speed of vehicle 102, a camber range of the wheels of vehicle 102, a camber speed of the wheels of vehicle 102, and speed and torque capabilities of drive motors. Effecting controller 123 can apply the correcting wheel torque and the correcting wheel angle.

Aside from wheel torque and wheel angle, it is contemplated that steering control system 100 can further provide a correcting wheel camber and a correcting wheel suspension. Calculating controller 121 can receive the environmental condition, the desired amount of turning, and the desired velocity to thereby determine at least one of a correcting wheel camber and a correcting suspension of at least one of first wheel 101 and second wheel 103. Additionally, effecting controller 123 can apply the correcting wheel camber and the correcting suspension to at least one of first wheel 101 and second wheel 103.

It is contemplated that calculating controller 121 can independently determine the correcting wheel torque and the correcting wheel angle for each of the wheels. For example, calculating controller 121 can determine (i) the correcting wheel torque and the correcting wheel angle for the first wheel, and (ii) a second correcting wheel torque and a second correcting wheel angle for the second wheel. Similarly, effecting controller 123 can independently adjust each of the wheels. Thus, steering control system 100 can provide precise adjustments to each of the wheels to improve vehicle performance based on the limitations of the vehicle and the environment.

It should be appreciated that calculating controller 121 can calculate at least one of a correcting wheel angle, a correcting wheel torque, a correcting wheel camber, and a correcting wheel suspension based on any combination of the desired velocity, the desired amount of turning, the vehicle characteristics, and the environmental condition. For example, calculating controller 121 can calculate at least one of a correcting wheel angle, a correcting wheel torque, a correcting wheel camber, and a correcting wheel suspension based on at least one of the desired velocity, the desired amount of turning, the vehicle characteristics, and the environmental condition.

Effecting controller 123 can be coupled to a first motor 127 of first wheel 101 and a second motor 129 of second wheel 103. Using first motor 127 and second motor 129, effecting controller 123 can apply the correcting wheel angle and wheel torque to first wheel 101 and second wheel 103. It is further contemplated that effecting controller 123 can use first motor 127 and second motor 129 to apply a correcting wheel camber and a correcting wheel suspension to first wheel 101 and second wheel 103. As shown in FIG. 2, first wheel 101 is coupled to first motor 127, and second wheel 103 is coupled to second motor 129. However, it is also contemplated that a single motor can be used for both first wheel 101 and second wheel 103.

In four-wheeled vehicles, a third motor 131 can be coupled to third wheel 107, and a fourth motor 132 can be coupled to fourth wheel 109. Similar to first motor 127 and second motor 129, effecting controller 123 can apply at least one of a correcting wheel angle, a correcting wheel torque, a correcting wheel camber, and a correcting wheel suspension to third wheel 107 and fourth wheel 109 via third motor 131 and fourth motor 132. In other embodiments, it is contemplated that a single motor can be used for first wheel 101, second wheel 103, third wheel 107, and fourth wheel 109 or that two motors can be used for the wheels (e.g., one motor for front wheels and other motor for rear wheels, or one motor for left wheels and other motor for right wheels).

Calculating controller 121 can further determine a steering mode for first wheel 101, second wheel 103, third wheel 107, and fourth wheel 109 based on at least one of the environmental condition, the desired amount of turning, and the desired velocity. Additionally, it is contemplated that calculating controller 121 can also receive a vehicle characteristic to determine the steering mode. Suitable steering modes for vehicle 102 include at least one of front wheel steering mode, rear wheel steering mode, all-wheel steering mode (e.g., crab steering), and zero turn steering mode.

It is contemplated that calculating controller 121 can determine the correcting wheel torque and the correcting wheel angle in real time. In such embodiment, environmental condition sensor 115, steering angle sensor 117, and speed sensor 119 can be continuously communicating with calculating controller 121 in order to determine the correcting wheel torque and the correcting wheel angle at any given time. It should be appreciated that calculating controller 121 can also continuously communicate with a source of vehicle characteristics to account for vehicle limitations. In other embodiments, calculating controller 121 can incrementally determine the correcting wheel torque and the correcting wheel angle at pre-determine time intervals. For example, calculating controller 121 can determine the correcting wheel torque and the correcting wheel angle every $\frac{1}{1000}$ of a second, $\frac{1}{100}$ of a second, $\frac{1}{10}$ second, 1 second, and so forth.

It should be appreciated that correcting wheel camber and correcting wheel suspension can also be determined by calculating controller 121 in real time or at pre-determined time intervals. Thus, calculating controller 121 can revise at least one of the correcting wheel torque, the correcting wheel angle, the correcting wheel camber, and the correcting wheel suspension in real time or at pre-determined time intervals based on at least one of the desired amount of turning, desired velocity of vehicle 102, environmental condition, and vehicle characteristic that is received.

As discussed above, calculating controller 121 can communicate with effecting controller 123 to apply the correcting wheel torque, the correcting wheel angle, the correcting wheel camber, and the correcting wheel suspension. The communication between calculating controller 121 and effecting controller 123 can also be in real time or at pre-determined time intervals to thereby apply at least one of the correcting wheel torque, the correcting wheel angle, the correcting wheel camber, and the correcting wheel suspension to improve performance of vehicle 102.

In some embodiments, a second plurality of vehicle characteristics that are specific to the vehicle are provided by a sensor or input by a user or database. It is contemplated that a second plurality of vehicle characteristics can be provided when a change has occurred to at least one vehicle characteristic of vehicle 102. For example, payload of vehicle 102 may change when a load is modified, the shape of vehicle 102 can change when a rod extends from vehicle body 105 to shift the center of mass, the distance between the wheels can change when one or both wheels are extended from vehicle body 105, or when a length between first wheel 101 and second wheel 103 changes.

In some instances, a change to vehicle 102 can occur after at least one of a correcting wheel angle, correcting wheel torque, correcting wheel camber, correcting wheel suspension is applied, which thereby creates a second plurality of vehicle characteristics. Calculating controller 121 can calculate a second correcting wheel torque and a second correcting wheel angle of at least one of first wheel 101 and second wheel 103 based on the second plurality of vehicle characteristics, an environmental condition, a desired amount of turning, and a desired velocity. The second correcting wheel torque and wheel angle can be applied by effecting controller 123 to at least one of first wheel 101 and second wheel 103. It is contemplated that second correcting wheel torque and wheel angle can replace a previously applied first correcting wheel torque and angle. Additionally, a second correcting wheel camber and a second correcting wheel suspension can also be determined based the second plurality of vehicle characteristics, an environmental condition, a desired amount of turning, and a desired velocity.

Aside from a change in a vehicle characteristic, it is also contemplated that steering control system 100 can further monitor and determine a deviation or change in at least one of the environmental condition, the desired amount of turning, and the desired velocity after the wheel torque and the wheel angle of at least one first wheel 101 and second wheel 103 is adjusted. For example, a deviation can be detected when an environmental condition changes (e.g., an obstruction moved after a correcting wheel torque and angle are applied, a low traction comprising loose material is cleared, etc.) or a vehicle characteristic changes (e.g., payload is modified, wheels are added to vehicle 102, etc.), or a deviation can be detected when at least one of a desired amount of turning, a desired velocity, an environmental condition, and a vehicle characteristic changes by a defined percentage. For example, it is contemplated that a deviation is detected when at least one of the desired amount of turning, the desired velocity, the environmental condition, and the vehicle characteristic changes by 0.1%-1%, 1%-10%, 10%-25%, or 25%-50%.

A second correcting wheel torque and a second correcting wheel angle of at least one of first wheel 101 and second wheel 103 can be calculated by calculating controller 121 to accommodate for the deviation, and effecting controller 123 can adjust the wheel torque and the wheel angle of at least of first wheel 101 and second wheel 103 based on the second correcting wheel torque and the second correcting wheel angle. It is contemplated that a second correcting wheel camber and a second correcting wheel suspension can also be calculated to accommodate the deviation.

Figure 3:
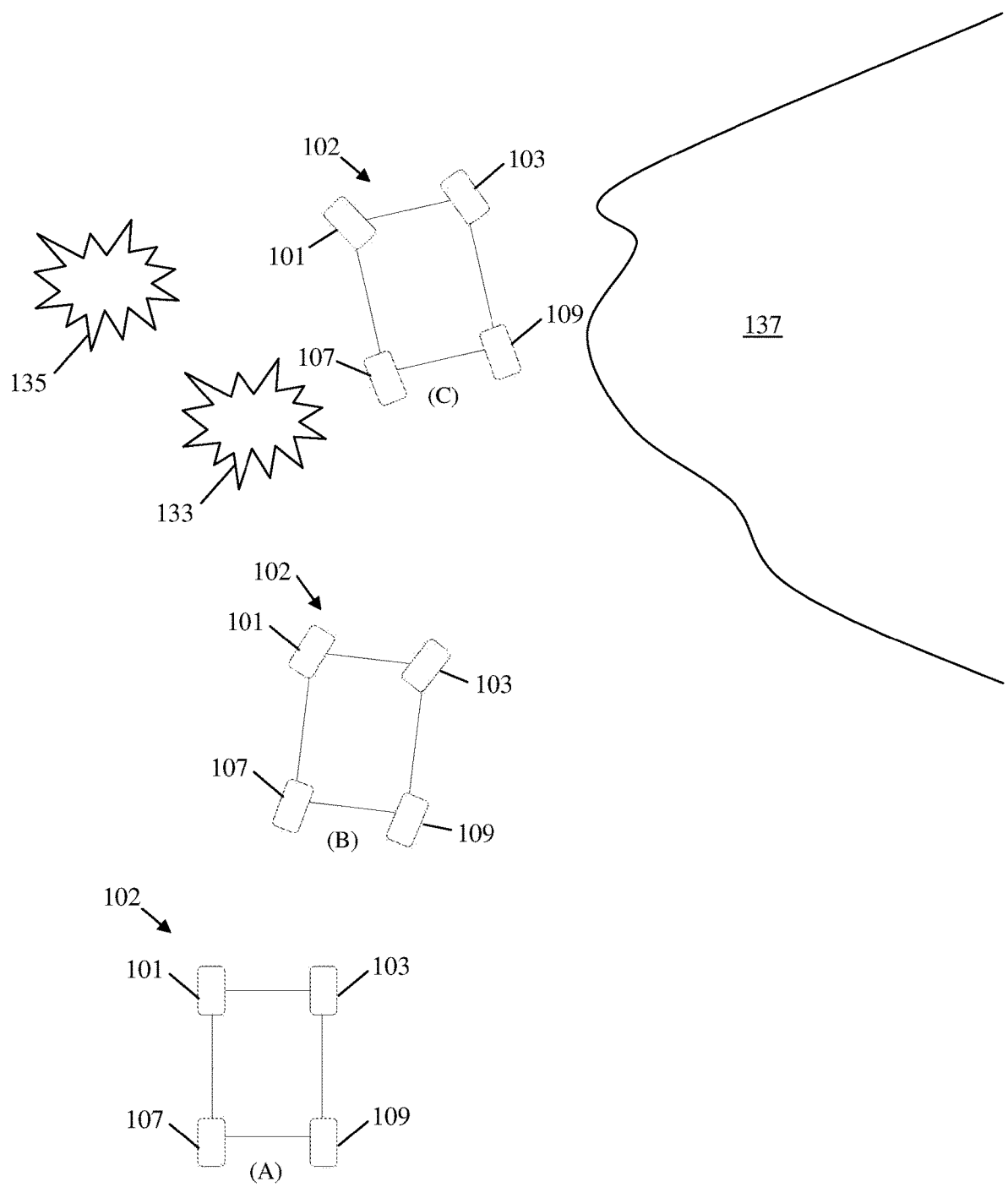
FIG. 3 is a graphical representation of the vehicle in FIG. 1 using the steering control system.
Figure 4:
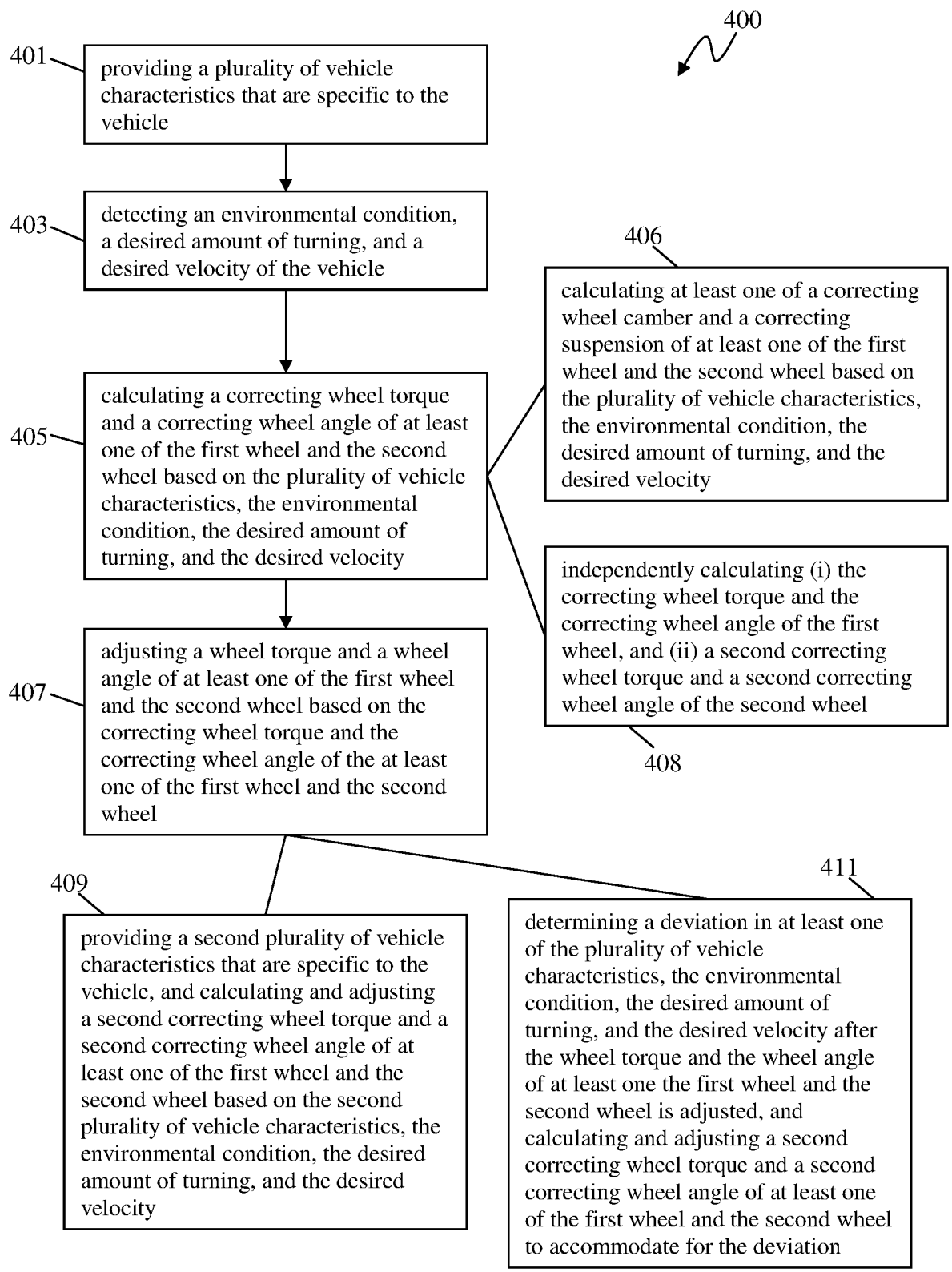
FIG. 4 is a flow chart of an embodiment of a method of controlling a vehicle.

FIG. 3 shows a graphical representation of vehicle 102 having steering control system 100 along a path. In position (A), vehicle 102 detects various environmental conditions, including a first obstruction 133, a second obstruction 135, and a low traction condition 137. As discussed above, vehicle 102 can receive an environmental condition using an environmental condition sensor. Furthermore, vehicle 102 receives a desired amount of turning and a desired velocity to travel down a path (e.g., a path from point (A) to a point beyond second obstruction 135). The desired amount of turning and desired velocity can be sensed via sensors that sense action taken by a driver of vehicle 102 in turning a steering wheel and pushing on a gas pedal. It is also contemplated that the desired amount of turning and desired velocity can be in the form of a velocity and vector input from a user. Nonetheless, steering control system 100 is made aware of a desired future location for vehicle 102.

Steering control system 100 can also consider vehicle characteristics of vehicle 102. For example, a plurality of vehicle characteristics that are specific to vehicle 102 can be provided by sensors, a database, or user input. A calculating controller of steering control system 100 can receive the environmental conditions (first obstruction 133, second obstruction 135, and low traction condition 137), the desired amount of turning, the desired velocity, and the plurality of vehicle characteristics to determine a correcting wheel torque and a correcting wheel angle of at least one of first wheel 101 and second wheel 103. It is contemplated that the correcting wheel torque and the correcting wheel angle take into account vehicle limitations and the environment to calculate the most efficient manner to operate vehicle 120 along a path. In other words, steering control system 100 anticipates adjustments to wheel torque and wheel angle that are needed as vehicle 102 travels along a path, and applies these pre-calculated adjustments as vehicle 102 travels along the path.

It should be appreciated that the calculating controller can also determine a correcting wheel camber and wheel suspension based on the environmental conditions (first obstruction 133, second obstruction 135, and low traction condition 137), the desired amount of turning, the desired velocity, and the plurality of vehicle characteristics. Thus, steering control system 100 provides a higher degree of control over each of first wheel 101, second wheel 103, third wheel 107, and fourth wheel 109 to accommodate limitations of the vehicle or the environment.

In position (B), steering control system 100 of vehicle 102 has steered vehicle 102 away from first obstruction 133 and second obstruction 135. A correcting wheel angle and a correcting wheel torque have been applied to at least one of first wheel 101 and second wheel 103. It is contemplated that a correcting wheel angle and a correcting wheel torque can be independently determined and applied to each of first wheel 101, second wheel 103, third wheel 107, and fourth wheel 109. Furthermore, it is contemplated that a correcting wheel camber and a correcting wheel suspension can be independently determined and applied to each of first wheel 101, second wheel 103, third wheel 107, and fourth wheel 109. Thus, each of the wheels can be controlled to maximize vehicle 102 performance.

The calculating controller can determine a plurality of a correcting wheel angle, wheel torque, wheel camber, and wheel suspension for each of first wheel 101, second wheel 103, third wheel 107, and fourth wheel 109. In such embodiment, a user or steering control system 100 can choose from the plurality of correcting wheel angle, wheel torque, wheel camber, and wheel suspension for vehicle 102. For example, calculating controller can determine a first correcting wheel angle, wheel torque, wheel camber, and wheel suspension for each of first wheel 101, second wheel 103, third wheel 107, and fourth wheel 109 that avoids first obstruction 133, second obstruction 135, and low traction condition 137, but user can override the first correcting wheel angle, wheel torque, wheel camber, and wheel suspension with a second correcting wheel angle, wheel torque, wheel camber, and wheel suspension whereby vehicle 102 passes over first obstruction 133.

As discussed above, it is also contemplated that calculating controller can determine a second correcting wheel angle, wheel torque, wheel camber, and wheel suspension based on a deviation or change of at least one of an environmental condition, a desired velocity, a desired amount of turning, and a vehicle characteristic. For example, if first obstruction 133 were to shift positions, steering control system of vehicle 102 can detect a deviation (e.g., the changed position of first obstruction 133) in an environmental condition and calculate at least one of a second correcting wheel angle, a second correcting torque, a second correcting wheel camber, and a second correcting wheel suspension based on the deviation. In another example, a load can be applied to vehicle 102 after the correcting wheel torque, correcting wheel angle, correcting wheel camber, and correcting wheel suspensions is applied, which is detected as a deviation to thereby allow calculating controller to calculate at least one second correcting wheel angle, wheel torque, wheel camber, and wheel suspension to accommodate the deviation.

In position (C), vehicle 102 is passing between first obstruction 133 and second obstruction 135, and low traction condition 137. It should be appreciated that each of first wheel 101, second wheel 103, third wheel 107, and fourth wheel 109 can receive a correcting wheel angle, wheel torque, wheel camber, and wheel suspension determined in position (A), which steers vehicle 102 between the various environmental conditions (first obstruction 133, second obstruction 135, and low traction condition 137) with no need to make a correction while vehicle 102 is on route. Thus, steering control system 100 anticipated the various adjustments to wheel angle, wheel torque, wheel camber, and wheel suspension in view of the limitations of vehicle and the environment (first obstruction 133, second obstruction 135, and low traction condition 137) to determine a correcting wheel angle, wheel torque, wheel camber, and wheel suspension prior to traveling down a path so as to reduce, or eliminate, the need for calculating correcting wheel angle, wheel torque, wheel camber, and wheel suspension while on the path.

In another aspect, a method 400 of controlling a vehicle a first wheel and a second wheel is contemplated. In step 401, a plurality of vehicle characteristics that are specific to the vehicle are provided. An environmental condition, a desired amount of turning, and a desired velocity of the vehicle are detected in step 403. It should be appreciated that sensors can be used to detect the environmental condition, the desired amount of turning, and the desired velocity. In other contemplated embodiments, the environmental condition, the desired amount of turning, and the desired velocity can be provided by a user (e.g., in the form a velocity and a vector) or a database.

It is contemplated that a desired amount of turning and a desired velocity of the vehicle correspond to a desired future location for vehicle. Furthermore, the plurality of vehicle characteristics can comprise at least two of a weight of vehicle, center of mass of vehicle, a distance between the first wheel and the second wheel, a length of the vehicle, and a width of the vehicle to determine the correcting wheel torque and the correcting wheel angle.

In step 405, a correcting wheel torque and a correcting wheel angle of at least one of the first wheel and the second wheel is calculated based on the plurality of vehicle characteristics, the environmental condition, the desired amount of turning, and the desired velocity. Additionally, or alternatively, at least one of a correcting wheel camber and a correcting suspension of at least one of the first wheel and the second wheel can be calculated based on the plurality of vehicle characteristics, the environmental condition, the desired amount of turning, and the desired velocity as shown in step 406.

In contemplated embodiments, each of the correcting wheel angle, the correcting wheel torque, and the correcting wheel camber can be independently calculated based on the plurality of vehicle characteristics, the environmental condition, the desired amount of turning, and the desired velocity. For example, a correcting wheel torque and wheel angle can be calculated for a first wheel, and a second correcting wheel torque and wheel angle can be calculated for the second wheel as shown in step 408.

In step 407, a wheel torque and a wheel angle of at least one of the first wheel and the second wheel can be adjusted based on the correcting wheel torque and the correcting wheel angle of the at least one of the first wheel and the second wheel. It is contemplated that motors on each wheel can be used to adjust the wheel torque and wheel angle. Additionally, it is contemplated that a wheel camber and a wheel suspension can be adjusted based on a correcting wheel camber and a correcting wheel suspension.

In some embodiments, the vehicle characteristics that are specific to the vehicle can change. As discussed above, a change in vehicle characteristics can occur when the vehicle receives a load or when the vehicle changes shape. In step 409, a second plurality of vehicle characteristics that are specific to the vehicle are provided, and a second correcting wheel torque and a second correcting wheel angle of at least one of the first wheel and the second wheel is calculated based on the second plurality of vehicle characteristics, the environmental condition, the desired amount of turning, and the desired velocity. Furthermore, it is contemplated that the wheel torque and the wheel angle of at least of the first wheel and the second wheel is adjusted based on the second correcting wheel torque and the second correcting wheel angle.

Similarly, a center of mass of the vehicle can be monitored via a sensor. At least one of a correcting wheel torque, a correcting wheel angle, a correcting wheel camber, and a correcting wheel suspension of at least one of the first wheel and the second wheel can be calculated to thereby shift the center of mass of the vehicle from a first location to a second location. This can be favorable when the second location for the center of mass reduces the risk of rollover for the vehicle. For example, the calculating controller can determine a correcting wheel angle and a correcting wheel torque for at least two wheels, such as to cause the vehicle to shift the center of mass to enable the vehicle to skid to a desired location.

Additionally, or alternatively, the steering control system can monitor for other deviations of at least one of the plurality of vehicle characteristics, the environmental condition, the desired amount of turning, and the desired velocity as shown in step 411. Typically, a deviation is detected after the wheel torque and the wheel angle of at least one the first wheel and the second wheel is adjusted, such that a further adjustment is recommended to accommodate the deviation. The further adjustment is preferably in the form of at least one of a second correcting wheel torque, wheel angle, wheel camber, and wheel suspension to at least one of the first wheel and the second wheel to accommodate for the deviation. The wheel torque and the wheel angle of at least of the first wheel and the second wheel is adjusted based on the second correcting wheel torque and the second correcting wheel angle. For example, a first correcting wheel torque and a first correcting wheel angle are adjusted to a second correcting wheel torque and a second correcting wheel angle to accommodate for the deviation.

While many of the embodiments described above are with respect to wheeled vehicles, it should be appreciated that the steering control system can also be incorporated in a tracked vehicle. For example, a tracked vehicle can detect an environmental condition, a desired amount of turning, and a desired velocity to thereby calculate a correcting track speed for at least one of a first continuous track and a second continuous track. As discussed above, the environmental condition, the desired amount of turning, and the desired velocity can be detected using sensors or can be received by a database or user input. Alternatively, the steering control system can be applied to a wheeled-vehicle having no steerable wheels, such that the steering control system determines correcting wheel torques to skid steer the vehicle to a desired location.

Additionally, it is contemplated that the steering control system can be applied to a watercraft vehicle. In such embodiment, the watercraft vehicle can detect an environmental condition (e.g., obstructions in the water, heavy waves, storm, etc.), a desired amount of turning, and a desired velocity to thereby determine a correcting rudder angle. Each of the environmental condition, the desired amount of turning, and the desired velocity can be monitored to determine whether there is a deviation. The deviation can be caused by a user modification to one of the desired amount of turning or desired velocity, or by a change in the environmental condition. For example, a correcting rudder angle can be determined for a watercraft, but an upcoming storm has moved into the path of the watercraft, which is detected by the steering control system to thereby determine a second correcting rudder angle for the watercraft.

Similarly, it is contemplated that the steering control system can be applied to aircraft (e.g., airplanes, unmanned aerial vehicle, etc.). In such embodiment, the aircraft can detect an environmental condition (e.g., obstruction in its path, heavy turbulence, etc.), a desired amount of turning, and a desired velocity to thereby determine a correcting steering angle. Depending on the type of aircraft, the correcting steering angle can be an adjustment of ailerons, or an adjustment of a rudder and/or thrust vectoring to modify the course of the aircraft.

Also, as used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A method of controlling a vehicle having a first motive element and a center of mass, comprising:
   detecting an environmental condition;
   anticipating a change in the center of mass of the vehicle based on the environmental condition;
   calculating a correcting torque and a correcting angle of the first motive element based on the environmental condition and the change in the center of mass of the vehicle; and
   adjusting a torque and an angle of the first motive element based on the correcting torque and correcting angle of the first motive element.

2. The method of claim 1, wherein the environmental condition is at least one of a low visibility, a low traction condition, a temperature, an obstruction, a high wind condition, and a slope of road.

3. The method of claim 1, wherein the vehicle comprises a second motive element, and the first motive element and the second motive element are steerable, and wherein the change in the center of mass comprises at least one of (i) extending the first motive element away from a body of the vehicle, (ii) extending the second motive element away from the body of the vehicle, (iii) expanding or contracting a width of the body of the vehicle, or (iv) expanding or contracting a length of the body of the vehicle.

4. The method of claim 1, wherein the first motive element is selected from the group consisting of a wheel or a track.

5. The method of claim 1, wherein the vehicle comprises a second motive element, further comprising calculating a correcting motive element torque and a correcting motive element angle of at least one of the first motive element and the second motive element to thereby shift the center of mass of the vehicle from a first location to a second location.

6. A steering control system for a vehicle having a first motive element and a center of mass, comprising:
   an environmental condition sensor that is configured to detect an environmental condition;
   a sensor configured to anticipate a change in the center of mass of the vehicle;
   a calculating controller coupled to the environmental condition sensor and the sensor, and configured to receive the environmental condition and the change in the center of mass of the vehicle to thereby determine a correcting torque and a correcting angle of the first motive element; and
   an effecting controller configured to apply the correcting torque and the correcting angle to the first motive element.

7. The steering control system of claim 6, wherein the environmental condition is at least one of a low visibility, a low traction condition, a temperature, a physical obstruction, a high wind condition, and a slope of road.

8. The steering control system of claim 6, wherein the calculating controller further determines a correcting camber and a correcting suspension of the first motive element.

9. The steering control system of claim 6, further comprising a second environmental condition sensor that is configured to detect a second environmental condition, and wherein the calculating controller is coupled to the second environmental condition sensor and is further configured to receive the second environment condition to thereby at least partially determine the correcting torque and the correcting angle of the first motive element.

10. The steering control system of claim 6, wherein the vehicle further comprises a second motive element, and the first motive element and the second motive element are each steerable, and wherein the change in the center of mass of the vehicle comprises at least one of (i) extending the first motive element from a body of the vehicle, (ii) extending the second motive element from the body of the vehicle, (iii) expanding or contracting a width of the body of the vehicle, and (iv) expanding or contracting a length of the body of the vehicle.

11. The steering control system of claim 6, wherein the vehicle comprises a second motive element, and wherein the calculating controller is configured to independently determine (i) the correcting torque and the correcting angle for the first motive element, and (ii) a second correcting torque and a second correcting angle for the second motive element.

12. The steering control system of claim 11, wherein the effecting controller is configured to independently adjust (i) the first motive element to apply the correcting torque and the correcting angle, and (ii) the second motive element to apply the second correcting torque and the second correcting angle.

13. The steering control system of claim 6, wherein the first motive element is selected from the group consisting of a wheel or a track.

14. A steering control system for a vehicle having a first motive element and a center of mass, comprising:
an environmental condition sensor that is configured to detect an environmental condition;
a processor configured to anticipate a change in the center of mass of the vehicle;
a calculating controller coupled to the environmental condition sensor and the processor, and configured to receive the environmental condition and the change in the center of mass of the vehicle to thereby determine a correcting camber and a correcting suspension of the first motive element; and
an effecting controller configured to apply the correcting camber and the correcting suspension to the first motive element.

15. The steering control system of claim 14, wherein the calculating controller further determines a correcting torque and a correcting angle of the first motive element.

16. The steering control system of claim 14, wherein the environmental condition is at least one of a low visibility, a low traction condition, a temperature, a physical obstruction, a high wind condition, and a slope of road.

17. The steering control system of claim 14, further comprising a second environmental condition sensor that is configured to detect a second environmental condition, and wherein the calculating controller is coupled to the second environmental condition sensor and is further configured to receive the second environment condition to thereby at least partially determine the correcting camber and the correcting suspension of the first motive element.

18. The steering control system of claim 14, wherein the vehicle comprises a second motive element, and wherein the calculating controller is configured to independently determine (i) the correcting camber and the correcting suspension for the first motive element, and (ii) a second correcting camber and a second correcting suspension for the second motive element.

19. The steering control system of claim 18, wherein the effecting controller is configured to independently adjust (i) the first motive element to apply the correcting camber and the correcting suspension, and (ii) the second motive element to apply the second correcting camber and the second correcting suspension.

20. The steering control system of claim 14, wherein the first motive element is selected from the group consisting of a wheel or a track.

* * * * *